US008462093B2

(12) United States Patent
Kato et al.

(10) Patent No.: US 8,462,093 B2

(45) Date of Patent: Jun. 11, 2013

(54) DISPLAY DEVICE AND DRIVING METHOD OF DISPLAY DEVICE

(75) Inventors: Masakazu Kato, Kanagawa (JP); Hiroyuki Sakurai, Kanagawa (JP); Kohichi Ohmura, Kanagawa (JP)

(73) Assignee: Sony Corporation, Tokyo (JP)

( * ) Notice: Subject to any disclaimer, the term of this patent is extended or adjusted under 35 U.S.C. 154(b) by 775 days.

(21) Appl. No.: 11/569,294

(22) PCT Filed: May 10, 2005

(86) PCT No.: PCT/JP2005/008842

§ 371 (c)(1), (2), (4) Date: Sep. 12, 2007

(87) PCT Pub. No.: WO2005/114632

PCT Pub. Date: Dec. 1, 2005

(65) Prior Publication Data

US 2008/0284695 A1 Nov. 20, 2008

(30) Foreign Application Priority Data

May 24, 2004 (JP) ................................ 2004-153201

(51) Int. Cl.

| | |
|---|---|
| ***G02F 1/133*** | (2006.01) |
| *G09G 3/36* | (2006.01) |
| *G09G 3/20* | (2006.01) |

(52) U.S. Cl.

USPC .............. 345/100; 345/99; 345/103; 345/209

(58) Field of Classification Search

USPC .................... 345/87–103, 204–206, 208–210

See application file for complete search history.

(56) References Cited

U.S. PATENT DOCUMENTS

| | | | | |
|---|---|---|---|---|
| 4,845,473 | A * | 7/1989 | Matsuhashi et al. | 345/103 |
| 5,376,944 | A * | 12/1994 | Mogi et al. | 345/100 |
| 5,907,314 | A | 5/1999 | Negishi | |
| 6,229,516 | B1 * | 5/2001 | Kim et al. | 345/103 |

(Continued)

FOREIGN PATENT DOCUMENTS

| | | |
|---|---|---|
| EP | 1 406 242 A2 | 9/2003 |
| EP | 1406242 | 4/2004 |

(Continued)

OTHER PUBLICATIONS

International Search Report dated Jun. 14, 2005.

(Continued)

*Primary Examiner* — Amr Awad

*Assistant Examiner* — Stephen Bray

(74) *Attorney, Agent, or Firm* — Dentons US LLP

(57) ABSTRACT

A IF inversion driving method writes signal voltage of the same polarity to a signal line over a 1F period, and therefore cannot prevent occurrence of crosstalk caused by coupling. Also, shading is caused. In an active matrix type liquid crystal display device including a pixel array unit 11 formed by two-dimensionally arranging pixels 20 in a form of a matrix, the pixel array unit 11 is divided into a plurality of areas (two areas 11A and 11B in a present example) in a vertical direction, while the plurality of areas being vertically scanned in order (alternately in the present example) in a unit of a row, pixels of the plurality of areas are selected in a unit of a row, and a video signal Vsig reversed in polarity in each H is written to the pixels of the selected row.

3 Claims, 10 Drawing Sheets

U.S. PATENT DOCUMENTS

| | | | | |
|---|---|---|---|---|
| 2002/0163493 | A1* | 11/2002 | Matsushima et al. | 345/98 |
| 2003/0080934 | A1* | 5/2003 | Ishiyama | 345/100 |
| 2004/0021650 | A1* | 2/2004 | Yamashita et al. | 345/204 |
| 2005/0099379 | A1* | 5/2005 | Iisaka | 345/100 |
| 2005/0243050 | A1* | 11/2005 | Koyama et al. | 345/98 |

FOREIGN PATENT DOCUMENTS

| | | |
|---|---|---|
| JP | 01-231096 | 9/1989 |
| JP | 05-073001 | 3/1993 |
| JP | 08-263016 | 10/1996 |
| JP | 10-228263 | 8/1998 |
| JP | 11-352938 | 12/1999 |
| JP | 2001-013928 | 1/2001 |
| JP | 2001-042287 | 2/2001 |
| JP | 2002-328654 | 11/2002 |
| JP | 2005-091781 | 4/2005 |

OTHER PUBLICATIONS

Japanese Office Action issued on Nov. 16, 2006.

European Search Report issued Feb. 5, 2008 in connection with European Patent Application No. 05739004.9.

Decision to Refuse a European Application dated Dec. 9, 2011 from European Patent Office for Application No. EP 05 739 004.9-2205.

* cited by examiner

FIG. 10
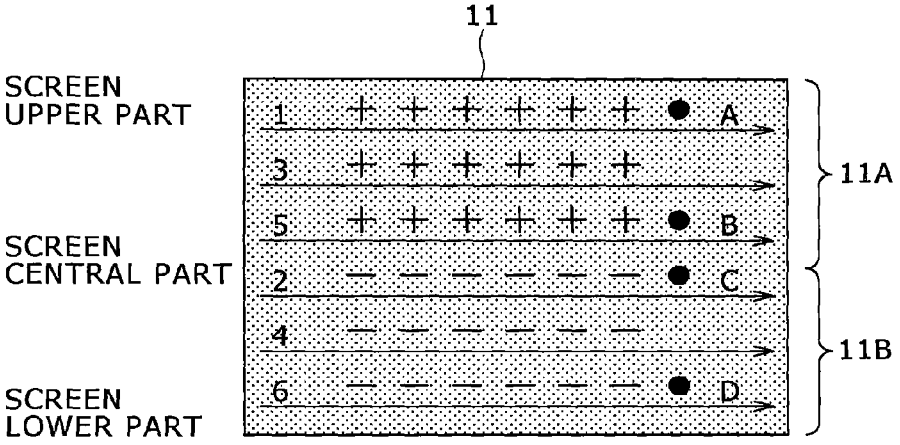
FIG. 11 – PRIOR ART
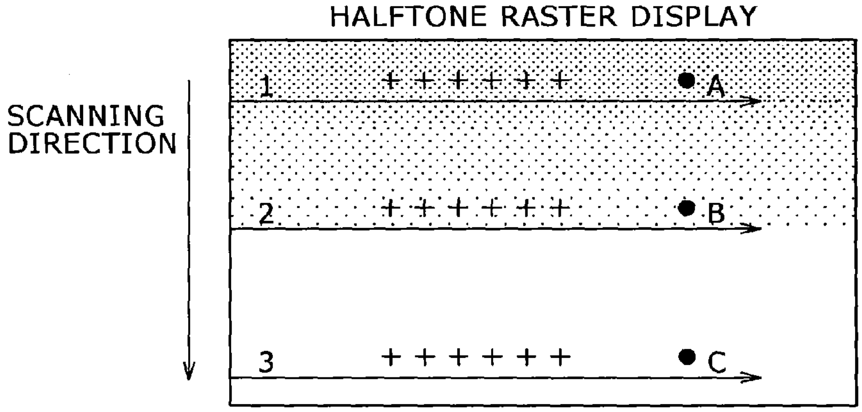

FIG. 12 – PRIOR ART
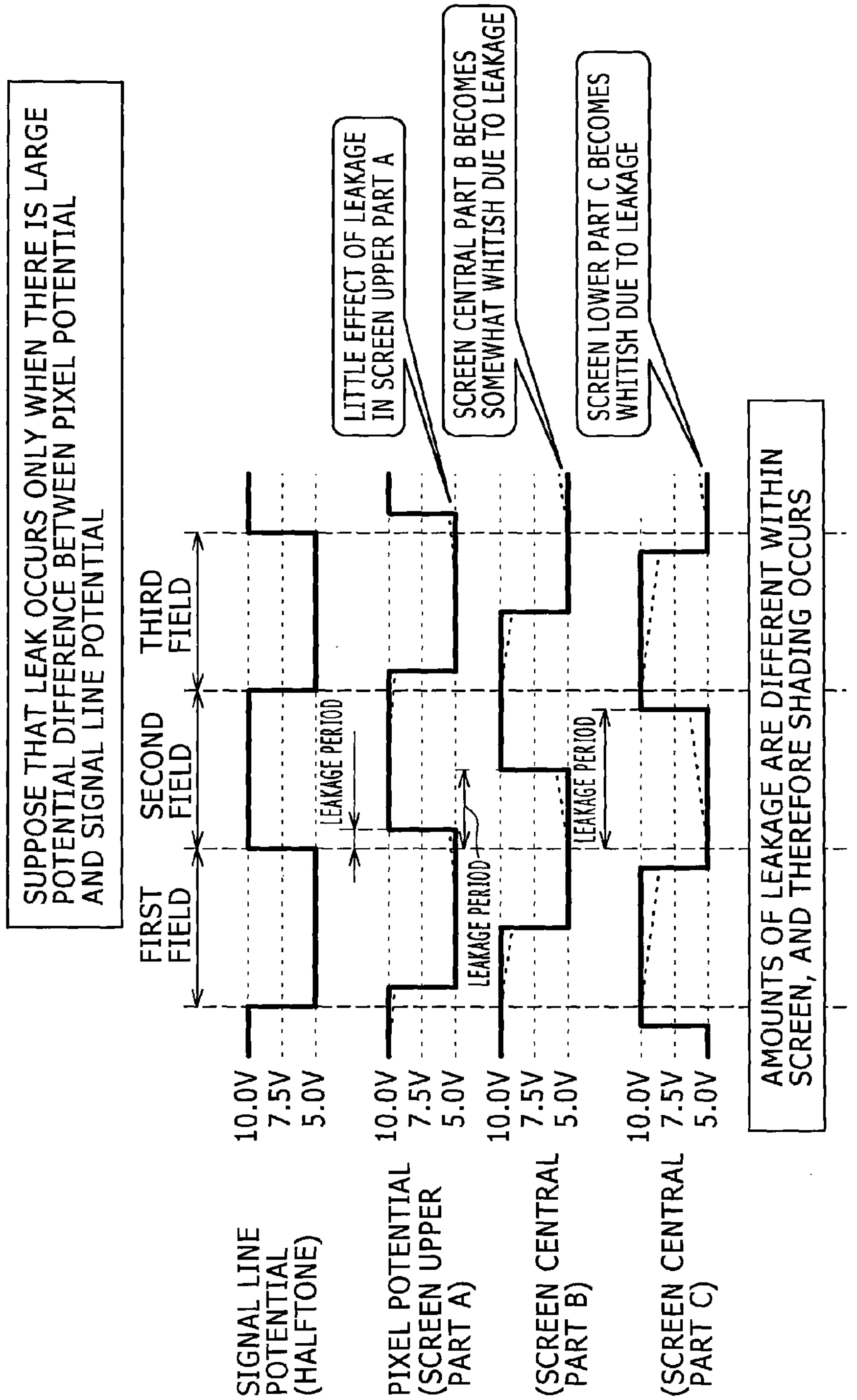

DISPLAY DEVICE AND DRIVING METHOD OF DISPLAY DEVICE

TECHNICAL FIELD

The present invention relates to a display device and a driving method of a display device, and particularly to a display device formed by two-dimensionally arranging pixels including an electrooptic element in the form of a matrix, and a driving method of the display device.

BACKGROUND ART

Display devices formed by two-dimensionally arranging pixels including an electrooptic element in the form of a matrix, for example liquid crystal display devices using a liquid crystal cell as an electrooptic element use an alternating-current driving method that reverses the polarity of a signal voltage applied to a pixel electrode with respect to the potential of a counter electrode of the liquid crystal cell in predetermined cycles. This is because degradation in resistivity of liquid crystal (resistance value specific to the material) or the like and an afterimage phenomenon referred to as "burn-in" occur when a direct-current voltage is applied to the liquid crystal cell over a long period of time.

Known as this alternating-current driving method are for example a 1H inversion driving method that inverts the polarity of a video signal Vsig in each H (H denotes a horizontal period) while a common voltage Vcom applied to the counter electrode of the liquid crystal cell is fixed, and a 1F inversion driving method that inverts the polarity of the video signal Vsig in each F (F refers to a field period, that is, a screen repetition period) while the common voltage Vcom applied to the counter electrode of the liquid crystal cell is fixed (see for example Japanese Patent Laid-open No. 2001-42287).

In a liquid crystal display device, a signal line for writing a video signal Vsig to pixels and a common line for supplying a common voltage Vcom common to each pixel to the counter electrode of a liquid crystal cell intersect each other, and there is a parasitic capacitance between the signal line and the common line. When the video signal Vsig is written to the signal line, coupling due to the parasitic capacitance causes the video signal Vsig to jump into the common line, and thereby the potential of the common line is swayed in a direction of the same polarity as that of the video signal Vsig, thus causing crosstalk.

For such a problem, the 1H inversion driving method inverts the potential of the signal line to which the video signal Vsig is written in each H, and can thereby cancel the swaying of the potential of the common line due to the coupling between lines (pixel rows), so that occurrence of the crosstalk caused by the coupling can be suppressed.

The 1F inversion driving method has advantages of being able to improve contrast and extend life using VA (Viewing Angle; vertical alignment) liquid crystal. On the other hand, the 1F inversion driving method writes a video signal Vsig of the same polarity to the signal line over a 1F period, and therefore cannot cancel the swaying of the potential of the common line due to the coupling between lines, so that occurrence of the crosstalk caused by the coupling cannot be suppressed.

When there is a large potential difference between pixel potential and signal line potential, a leak occurs in a switching element, for example a TFT (Thin Film Transistor) of a pixel due to difference in source/drain shape. The amount of the leak differs within one screen. Therefore, as shown in FIG. 11, shading, which causes degradation in picture quality, occurs. Specifically, taking as an example a case where the common voltage Vcom is 7.5 V and the signal line potential is 10.0 V on an H-side/5.0 V on an L-side (halftone), as shown in FIG. 12, for example, a screen upper part A, a screen central part B, and a screen lower part C have different leakage periods, and thereby an amount of leakage differs within one screen. Thus, there is little effect of leakage in the screen upper part A, the screen central part B becomes somewhat whitish due to an effect of leakage, and the screen lower part C becomes whitish due to an effect of leakage, so that shading occurs.

DISCLOSURE OF INVENTION

The present invention has been made in view of the above-described problems, and it is an object of the present invention to provide a display device and a driving method of the display device that can suppress occurrence of crosstalk and shading while improving contrast and extending life using VA liquid crystal, which is advantages of the 1F inversion driving method.

In order to achieve the above object, in the present invention, a display device including a pixel array unit, the pixel array unit being formed by two-dimensionally arranging pixels including an electrooptic element in a form of a matrix, and the pixel array unit being divided into a plurality of areas in a vertical direction, employs a constitution in which the plurality of areas being vertically scanned in order in a unit of a row, pixels of the plurality of areas are selected in a unit of a row, and a video signal inverted in polarity in each horizontal period (H) is written to the pixels of the selected row.

In the display device having the above-described constitution, the plurality of areas being vertically scanned in order in a unit of a row, or for example two areas being vertically scanned alternately in a case of a two-part division, pixels of the plurality of areas are selected in a unit of a row, so that 1F inversion driving can be realized in each of the areas. In addition, a video signal inverted in polarity in each H is written to the pixels of the selected row, whereby 1H inversion driving can be realized. As a result, it is possible to have the advantages of the 1F inversion driving method and the advantages of the 1H inversion driving method.

BRIEF DESCRIPTION OF DRAWINGS

FIG. 10 is a diagram showing that shading does not occur in halftone raster display.

FIG. 11 is a diagram showing that shading occurs in halftone raster display.

FIG. 12 is a timing chart of assistance in explaining a problem of the related art.

BEST MODE FOR CARRYING OUT THE INVENTION

An embodiment of the present invention will hereinafter be described in detail with reference to the drawings.

Figure 1:
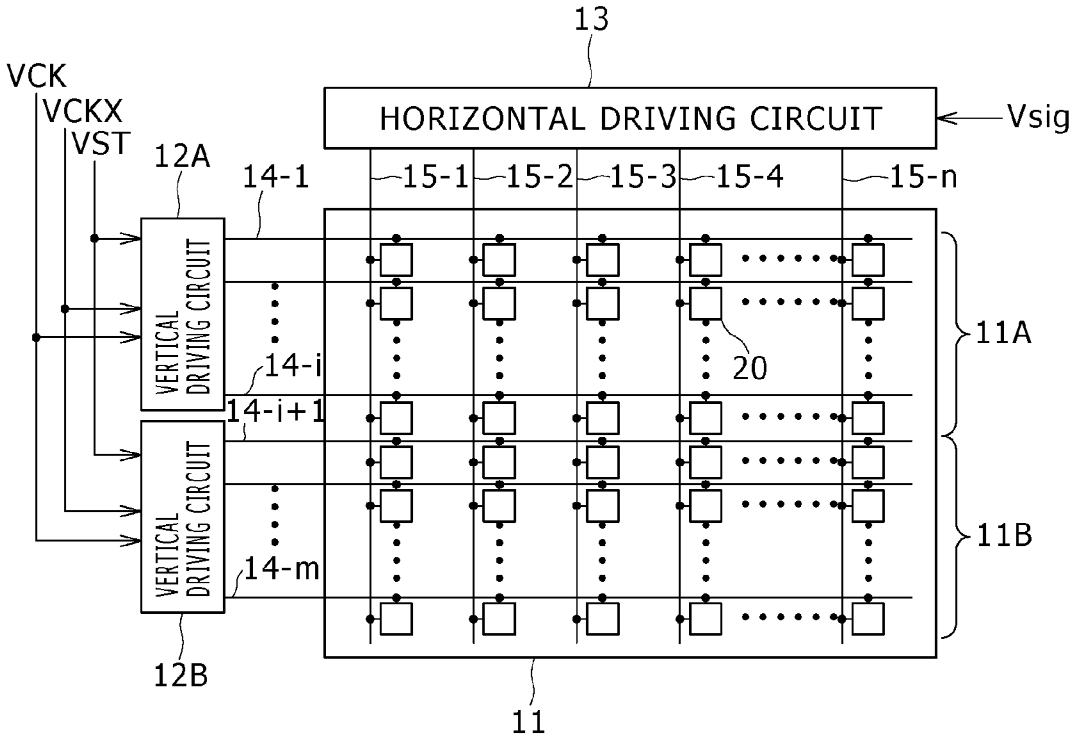
FIG. 1 is a block diagram schematically showing a configuration of an active matrix type liquid crystal display device according to one embodiment of the present invention.

FIG. 1 is a block diagram schematically showing a configuration of a display device according to one embodiment of the present invention. Description in the following will be made by taking as an example an active matrix type liquid crystal display device using a liquid crystal cell as an electrooptic element of a pixel.

As is clear from FIG. 1, the active matrix type liquid crystal display device according to the present embodiment includes a pixel array unit 11, for example two vertical driving circuits 12A and 12B, and a horizontal driving circuit 13. The pixel array unit 11 is formed by two-dimensionally arranging pixels 20 including a liquid crystal cell as an electrooptic element in the form of a matrix on a transparent insulating substrate, for example a glass substrate (not shown), and arranging scanning lines 13-1 to 13-*m* in each row and signal lines 14-1 to 14-*n* in each column for the arrangement of the pixels in the form of the matrix (m rows and n columns). The glass substrate is disposed so as to be opposed to another glass substrate (not shown) with a predetermined gap between the glass substrates, and a liquid crystal material is sealed between the two glass substrates, whereby a liquid crystal panel is formed.

Figure 2:
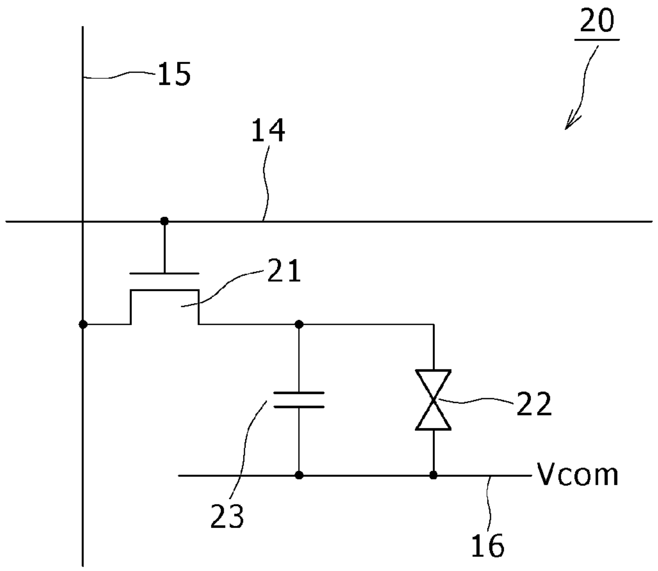
FIG. 2 is a circuit diagram showing an example of circuit configuration of a pixel (pixel circuit).

FIG. 2 is a circuit diagram showing an example of circuit configuration of a pixel (pixel circuit) 20. As is clear from FIG. 2, the pixel 20 includes: a pixel transistor, for example a TFT (Thin Film Transistor) 21; a liquid crystal cell 22 having a pixel electrode connected to the drain electrode of the TFT 21; and a storage capacitor 23 having one electrode connected to the drain electrode of the TFT 21. The liquid crystal cell 22 represents a liquid crystal capacitance occurring between the pixel electrode and a counter electrode formed so as to be opposed to the pixel electrode.

The TFT 21 has a gate electrode connected to a scanning line 14 (14-1 to 14-*m*), and has a source electrode connected to a signal line 15 (15-1 to 15-*n*). In addition, for example, the counter electrode of the liquid crystal cell 22 and another electrode of the storage capacitor 23 are connected to a common line 16, which is common to each pixel. The counter electrode of the liquid crystal cell 22 is supplied with a common voltage (counter electrode voltage) Vcom, which is common to each pixel, via the common line 16.

The pixel array unit 11 having the pixel arrangement of the m rows and the n columns is divided into an upper part and a lower part at a midpoint position in a vertical direction (top-to-bottom direction of the figure). That is, letting i (=n/2) be ½ of the number n of lines (number of columns), the pixel array unit 11 is divided into an upper side pixel part 11A of a first to an ith row and a lower side pixel part 11B of an (i+1)th to an nth row. Incidentally, the division of the pixel array unit 11 in the top-to-bottom direction is not limited to division into two parts, and the pixel array unit 11 may be divided in the top-to-bottom direction into an arbitrary number of parts, such as three parts, four parts, . . . by an equal number of lines.

A peripheral circuit including the vertical driving circuits 12A and 12B and the horizontal driving circuit 13 is integrated on the same substrate (liquid crystal panel) as the pixel array unit 11, for example. A number of vertical driving circuits 12A and 12B which number corresponds to the number of divided parts of the pixel array unit 11 are provided, and sequentially select pixels in a unit of a row in the pixel array unit 11 via the scanning lines 16-1 to 16-*n*. The present invention is characterized by a concrete configuration and operation of the vertical driving circuits 12A and 12B, and details thereof will be described later in detail.

Incidentally, in this case, the two vertical driving circuits 12A and 12B are arranged on one of a left side and a right side of the pixel array unit 11, and the scanning lines 16-1 to 16-*n* are driven from the one side. However, the vertical driving circuits 12A and 12B may be disposed on both of the left side and the right side of the pixel array unit 11, and the scanning lines 16-1 to 16-*n* may be driven from both sides.

The horizontal driving circuit 13 is formed by for example a shift register, an analog switch and the like. The horizontal driving circuit 13 writes an externally supplied video signal Vsig to pixels 20 in a row selected sequentially by the vertical driving circuits 12A and 12B on a pixel unit (dot-sequential) basis or a row unit (line-sequential) basis via the signal lines 15-1 to 15-*m*. It is to be noted that the polarity of the video signal Vsig output from the horizontal driving circuit 13 to the signal lines 15-1 to 15-*m* is reversed in each H (H denotes a horizontal period).

Description will next be made of the concrete configuration and operation of the vertical driving circuits 12A and 12B, which are a characteristic part of the present invention.

Each of the vertical driving circuits 12A and 12B is basically formed by a combination of a shift register, NAND circuits, and logical circuits such as inverters or the like. The vertical driving circuits 12A and 12B are supplied with a vertical start pulse VST for giving a command to start vertical scanning and vertical clock pulses VCK and VCKX that serve as a reference for the vertical scanning and have phases opposite to each other.

It is to be noted that since the pixel array unit 11 is divided into two parts and the vertical scanning is performed by the two vertical driving circuits 12A and 12B in the present example, the periods of the vertical start pulse VST and the vertical clock pulses VCK and VCKX are set to twice the periods of a vertical start pulse and vertical clock pulses used when the pixels 20 of the pixel array unit 11 are vertically scanned by one vertical driving circuit. Incidentally, when the pixel array unit 11 is divided into N parts (N=3, 4, . . . ), it suffices to set the periods of the vertical start pulse VST and the vertical clock pulses VCK and VCKX to N times the periods of the vertical start pulse and the vertical clock pulses mentioned above.

Figure 3:
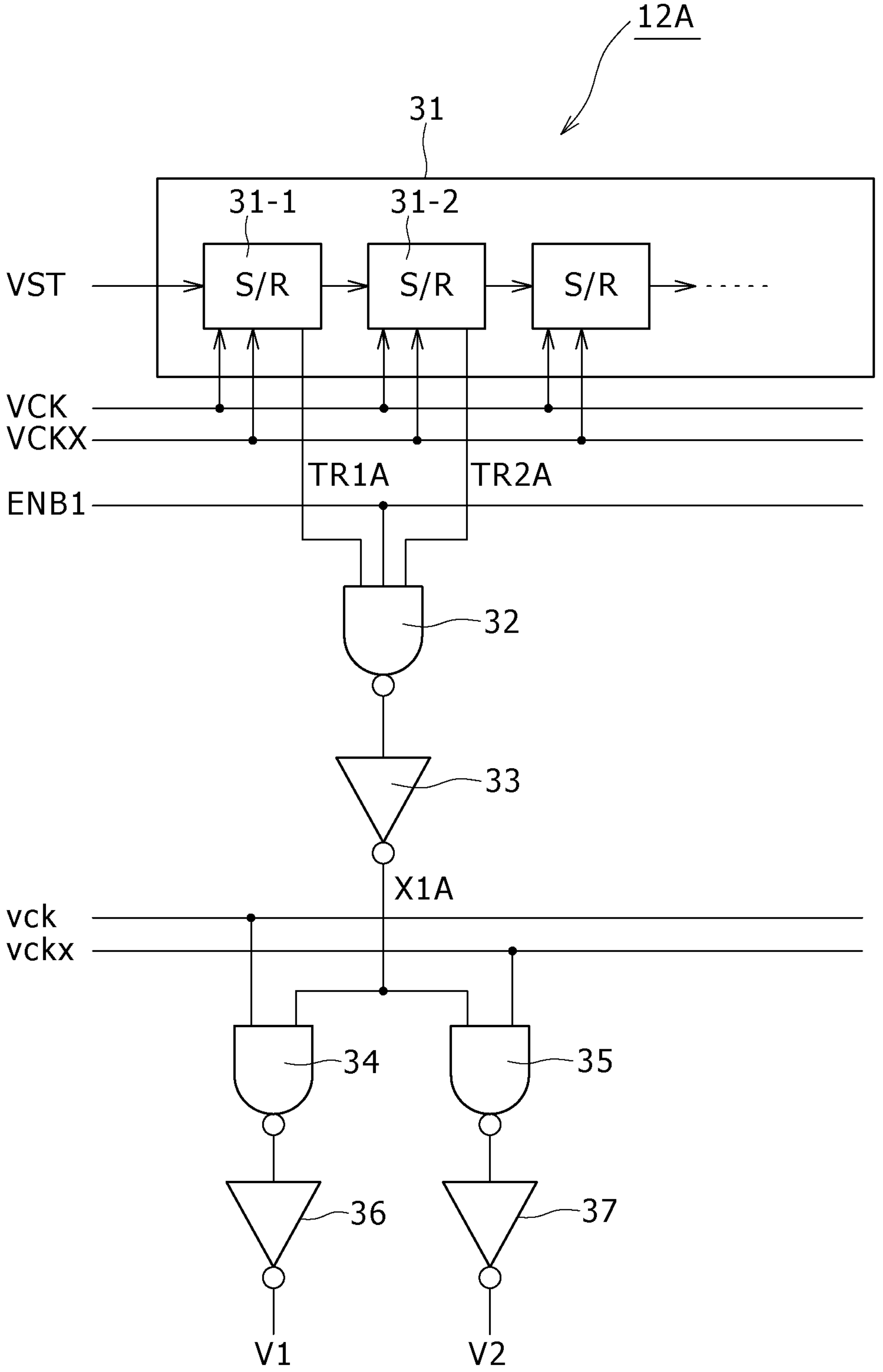
FIG. 3 is a block diagram showing an example of configuration of a vertical driving circuit on an upper side.

FIG. 3 is a block diagram showing an example of configuration of the vertical driving circuit 12A that vertically scans the pixels of the upper side pixel part 11A. For simplicity of the figure, FIG. 3 shows the configuration of only a circuit part generating drive pulses V1 and V2 for selecting a first pixel row and a second pixel row of the upper side pixel part 11A.

In FIG. 3, a shift register 31 has m/2 transfer stages (SIR) 31-1, 31-2, . . . corresponding to the number m of lines (number of columns) of the pixel array unit 11, the transfer stages being cascaded. When supplied with the vertical start pulse VST, the shift register 31 performs transfer (shift) operation in synchronism with the vertical clock pulses VCK and VCKX opposite to each other in phase. Thereby the shift register 31 sequentially outputs transfer pulses TR1A and TR2A from the respective transfer stages 31-1, 31-2, . . . . The transfer pulse TR1A of the own transfer stage 31-1 and the transfer pulse TR2A of the next transfer stage 31-2 are given to a three-input NAND circuit 32 as two inputs therefor. The NAND circuit 32 is supplied with an enable pulse ENB1 as the other input. The enable pulse ENB1 is a pulse signal having a period of ¼ of the period of the vertical clock pulse VCK and having a pulse width narrower than ¼ of the pulse width of the vertical clock pulse VCK.

An output pulse of the NAND circuit 32 is inverted by an inverter 33, and then supplied as one input to each of two-input NAND circuits 34 and 35. The NAND circuit 34 is supplied with a vertical clock pulse vck as another input. The NAND circuit 35 is supplied with a vertical clock pulse vckx opposite in phase to the vertical clock pulse vck as another input. The vertical clock pulses vck and vckx are pulse signals having the same period as the vertical clock pulses VCK and VCKX, and having phases shifted by 90 degrees with respect to the vertical clock pulses VCK and VCKX. Output pulses of the NAND circuits 34 and 35 respectively drive the scanning lines 14-1 and 14-2 in the first row and the second row as drive pulses V1 and V2 for selecting the first row and the second row of the upper side pixel part 11A.

Figure 4:
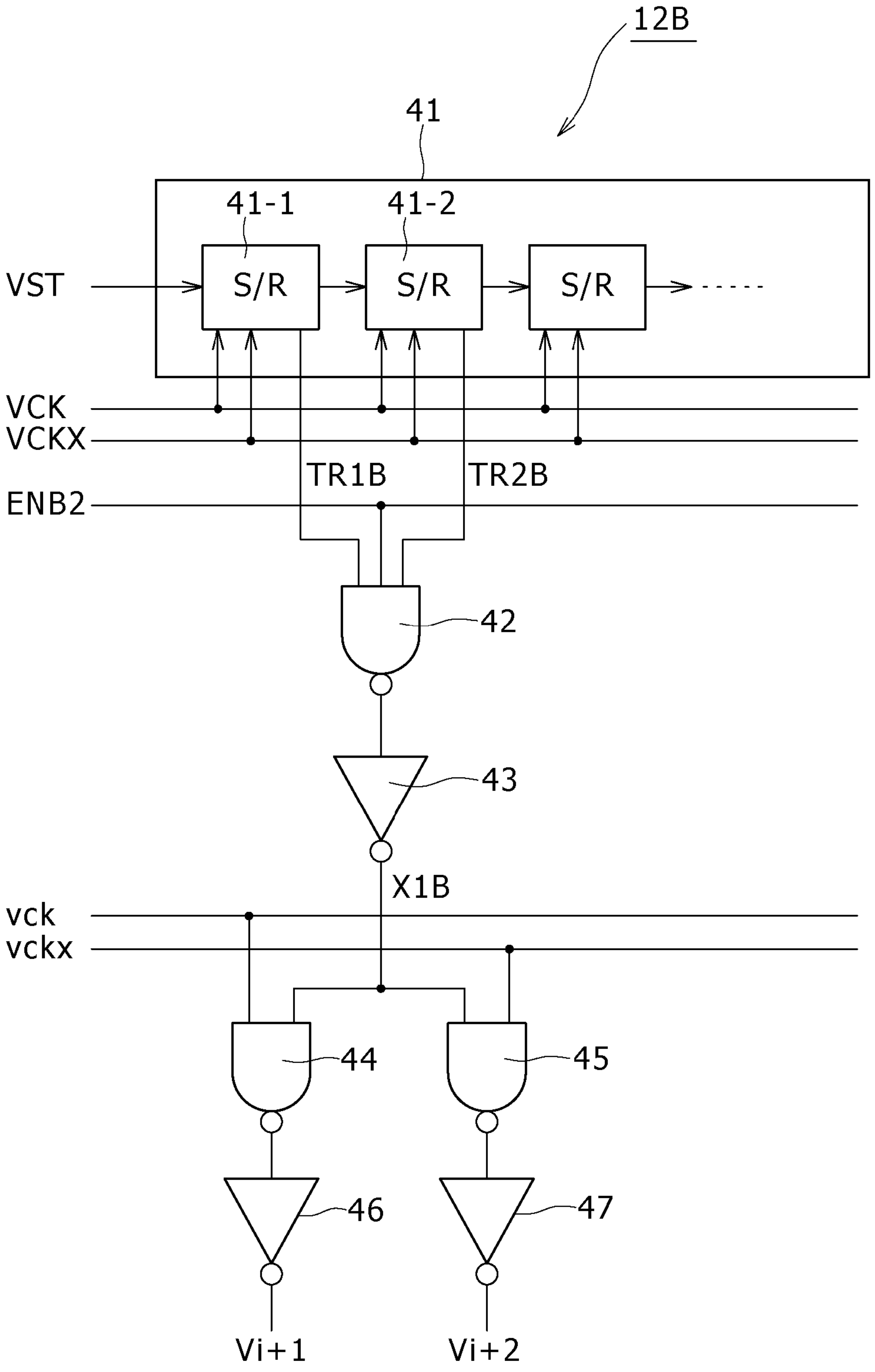
FIG. 4 is a block diagram showing an example of configuration of a vertical driving circuit on a lower side.

FIG. 4 is a block diagram showing an example of configuration of the vertical driving circuit 12B that vertically scans the pixels of the lower side pixel part 11B. For simplicity of the figure, FIG. 4 shows the configuration of only a circuit part generating drive pulses Vi and Vi+1 for selecting an ith pixel row and an (i+1)th pixel row of the lower side pixel part 11B.

In FIG. 4, as with the shift register 31, a shift register 41 has m/2 transfer stages (S/R) 41-1, 41-2, . . . , the transfer stages being cascaded. When supplied with the vertical start pulse VST, that is, in the same timing as the shift register 31, the shift register 41 starts transfer operation in synchronism with the vertical clock pulses VCK and VCKX. Thereby the shift register 41 sequentially outputs transfer pulses TR1B and TR2B from the respective transfer stages 41-1, 41-2, . . . . The transfer pulse TR1B of the own transfer stage 41-1 and the transfer pulse TR2B of the next transfer stage 41-2 are given to a three-input NAND circuit 42 as two inputs therefor. The NAND circuit 42 is supplied with an enable pulse ENB2 as the other input. As with the enable pulse ENB1, the enable pulse ENB2 is a pulse signal having a period of ¼ of the period of the vertical clock pulse VCK and having a pulse width narrower than ¼ of the pulse width of the vertical clock pulse VCK. In addition, the enable pulse ENB2 is shifted in phase by 180 degrees with respect to the enable pulse ENB1.

An output pulse of the NAND circuit 42 is inverted by an inverter 43, and then supplied as one input to each of two-input NAND circuits 44 and 45. The NAND circuit 44 is supplied with the vertical clock pulse vck as another input. The NAND circuit 35 is supplied with the vertical clock pulse vckx as another input. The vertical clock pulses vck and vckx are pulse signals having phases shifted by 90 degrees with respect to the vertical clock pulses VCK and VCKX. Output pulses of the NAND circuits 44 and 45 respectively drive the scanning lines 14-*i*+1 and 14-*i*+2 in the (i+1)th row and the (i+2)th row as drive pulses Vi+1 and Vi+2 for selecting the first row and the second row of the lower side pixel part 11B, or the (i+1)th row and the (i+2)th row of the whole.

The circuit operation of the vertical driving circuits 12A and 12B having the above-described configuration will next be described with reference to a timing chart of FIG. 5.

Figure 5:
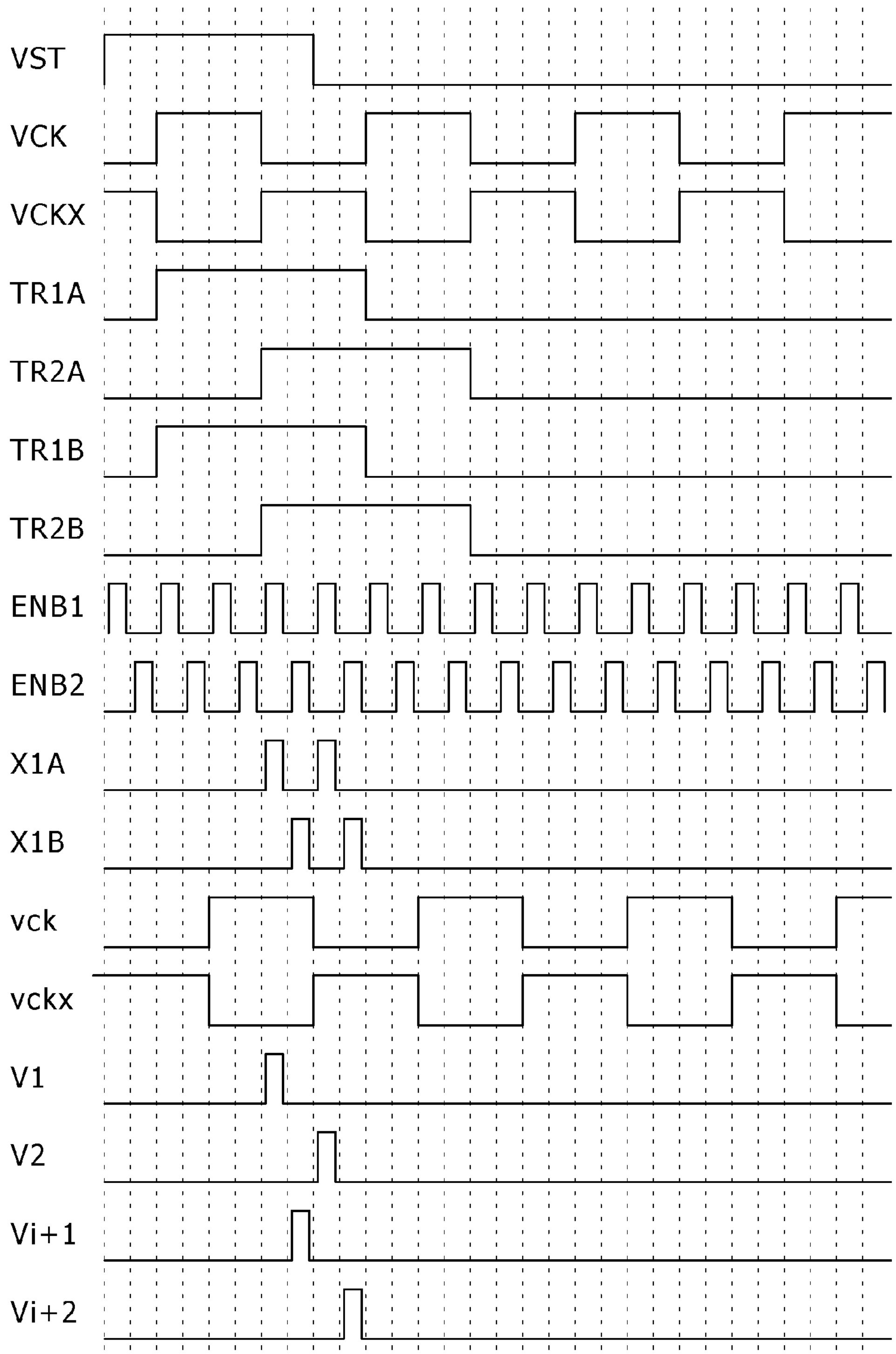
FIG. 5 is a timing chart of assistance in explaining circuit operation of the vertical driving circuits on the upper side and the lower side.

The timing chart of FIG. 5 shows timing relations between the vertical start pulse VST, the vertical clock pulses VCK and VCKX opposite to each other in phase, the transfer pulses TR1A and TR2A output from the shift register 31, the transfer pulses TR1B and TR2B output from the shift register 41, the enable pulses ENB1 and ENB2, output pulses X1A and X1B of the inverters 33 and 43, the vertical clock pulses vck and vckx opposite to each other in phase, the drive pulses V1 and V2 output from the vertical driving circuit 12A, and the drive pulses Vi+1 and Vi+2 output from the vertical driving circuit 12B.

First, the vertical start pulse VST is supplied to each of the shift registers 31 and 41 of the vertical driving circuits 12A and 12B, whereby the shift registers 31 and 41 simultaneously start transfer operation (shift operation). As a result of the transfer operation, the transfer pulses TR1A, TR2A, . . . are sequentially output from the shift register 31, and the transfer pulses TR1B, TR2B, . . . are sequentially output from the shift register 41.

Next, the NAND circuit 33 obtains a logical product of the transfer pulses TR1A and TR2A and the enable pulse ENB1, whereby a pulse signal of two enable pulses ENB1, that is, two consecutive pulses X1A are output from the inverter 33. Similarly, the NAND circuit 43 obtains a logical product of the transfer pulses TR1B and TR2B and the enable pulse ENB2, whereby a pulse signal of two enable pulses ENB2, that is, two consecutive pulses X1B are output from the inverter 43.

Next, the NAND circuit 34 obtains a logical product of the output pulse X1A of the inverter 33 and the vertical clock pulse vck, whereby the drive pulse V1 is output from an inverter 36. Then the NAND circuit 35 obtains a logical product of the output pulse X1A of the inverter 33 and the vertical clock pulse vckx, whereby the drive pulse V2 is output from an inverter 37.

Similarly, the NAND circuit 44 obtains a logical product of the output pulse X1B of the inverter 43 and the vertical clock pulse vck, whereby the drive pulse Vi+1 is output from an inverter 46. Then the NAND circuit 45 obtains a logical product of the output pulse X1B of the inverter 43 and the vertical clock pulse vckx, whereby the drive pulse Vi+2 is output from an inverter 47.

Since the enable pulse ENB1 and the enable pulse ENB2 are shifted in phase by 180 degrees from each other, as is clear from the timing chart of FIG. 5, the drive pulses V1, V2, . . . and the drive pulses Vi+1, Vi+2, . . . are alternately output from the vertical driving circuits 12A and 12B. That is, on a time axis, the drive pulse V1, the drive pulse Vi+1, the drive pulse V2, the drive pulse Vi+2, . . . are output in that order.

Description will next be made of operation when display driving is performed using the drive pulses V1, V2, . . . and the drive pulses Vi+1, Vi+2, . . . alternately output from the vertical driving circuits 12A and 12B having the above configuration.

Figure 6:
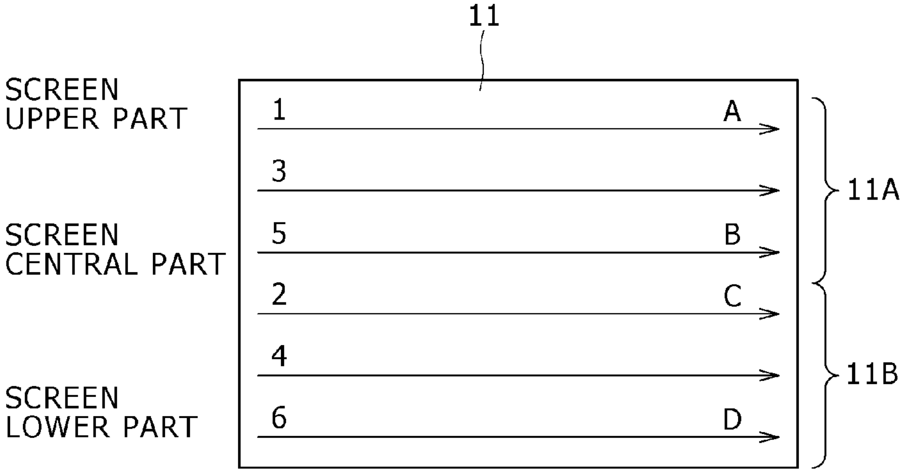
FIG. 6 is a diagram of assistance in explaining the operation, the diagram showing a sequence of vertical scanning in display driving.
Figure 7:
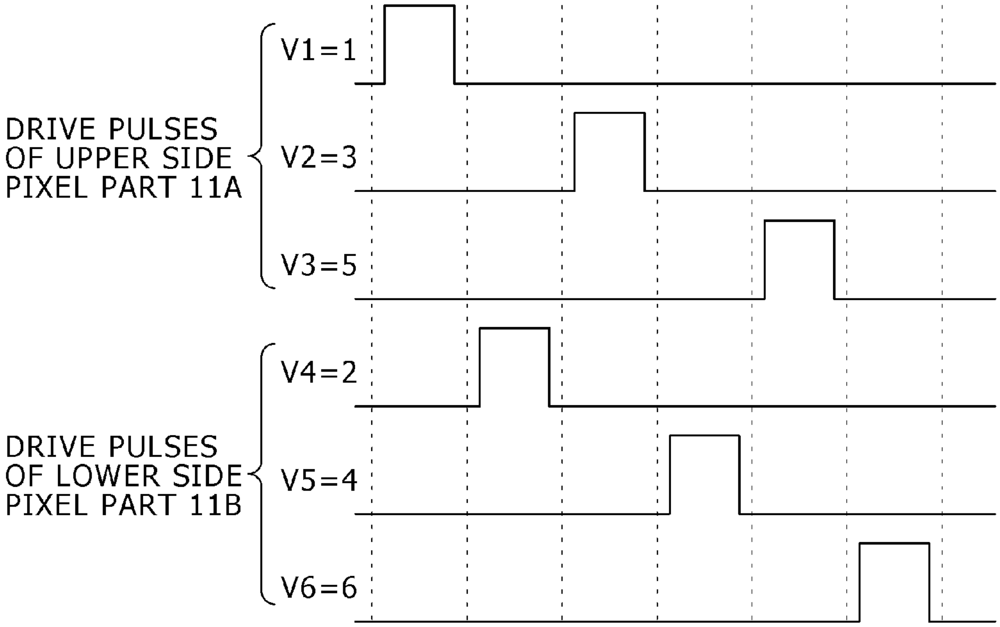
FIG. 7 is a timing chart showing scanning timing in the display driving.

In the following, to facilitate understanding, description will be made by taking as an example a case where, as shown in FIG. 6, a total of six vertical scanning operations are performed by vertically scanning an upper part (screen upper part A), a central part, and a lower part (screen central part B) of the upper side pixel part 11A in order and vertically scanning an upper part (screen upper part B), a central part, and a lower part (screen lower part C) of the lower side pixel part 11B in order. At this time, as shown in FIG. 7, drive pulses V1, V2, and V3 are output from the vertical driving circuit 12A in order, and drive pulses V4, V5, and V6 are output from the vertical driving circuit 12B in order.

On a time axis, the drive pulse V1, the drive pulse V4, the drive pulse V2, the drive pulse V5, the drive pulse V3, and the drive pulse V6 are output in that order.

Thus, display driving is performed using the drive pulses V1, V2, . . . and the drive pulses Vi+1, Vi+2, . . . alternately output from the two vertical driving circuits 12A and 12B, whereby rows are selected in order of 1. the upper part of the upper side pixel part 11A, 2. the upper part of the lower side pixel part 11B, 3. the central part of the upper side pixel part 11A, 4. the central part of the lower side pixel part 11B, 5. the lower part of the upper side pixel part 11A, and 6. the lower part of the lower side pixel part 11B.

Meanwhile, the horizontal driving circuit 13 writes the video signal Vsig reversed in polarity in each H to the selected rows via the signal lines 15-1 to 15-*n*. At this time, of course, the video signal Vsig is rearranged in advance in such a manner as to correspond to the sequence of the vertical scanning in a signal source (not shown) that supplies the video signal Vsig.

Figure 8A:
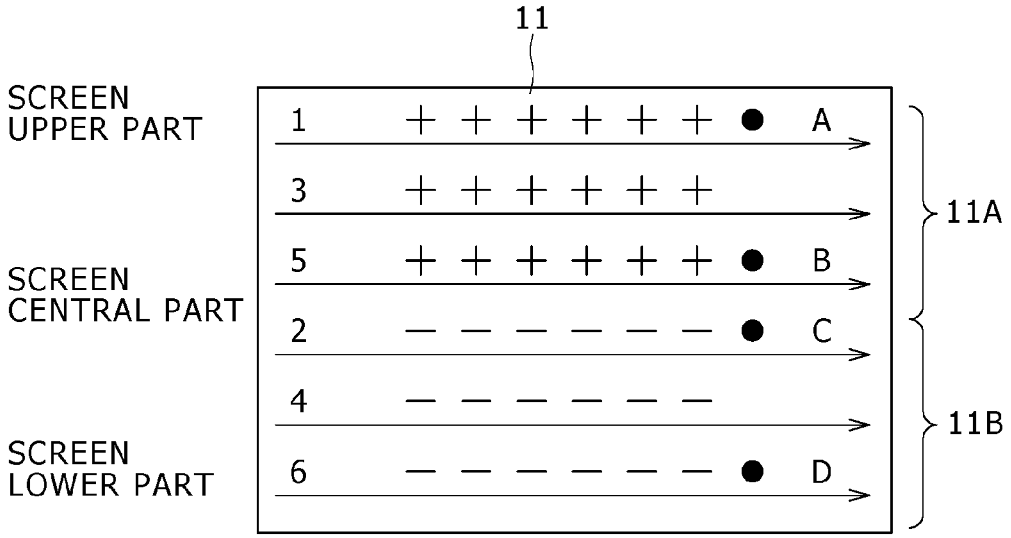
FIG. 8A is a diagram showing polarity of pixel potential in a first field.
Figure 8B:
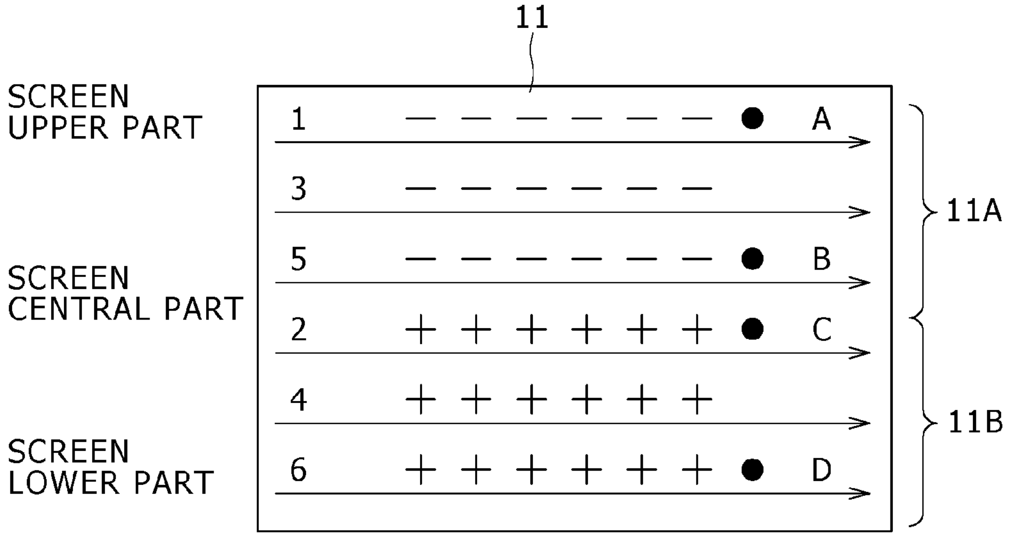
FIG. 8B is a diagram showing polarity of pixel potential in a second field.

As a result of such display driving, supposing that the polarity of the video signal Vsig is reversed in order of positive (+), negative (−), . . . in a first field, as shown in FIG. 8A, only a video signal Vsig (+) of positive polarity is written to the pixels of the upper side pixel part 11A, and only a video signal Vsig (−) of negative polarity is written to the pixels of the lower side pixel part 11B. In a second field, to realize field inversion driving, the polarity of the video signal Vsig is reversed in order of negative, positive, . . . . Thus, as shown in FIG. 8B, only a video signal Vsig (−) of negative polarity is written to the pixels of the upper side pixel part 11A, and only a video signal Vsig (+) of positive polarity is written to the pixels of the lower side pixel part 11B.

As is clear from the above description of the operation, a driving method as described above realizes 1H inversion driving by writing the video signal Vsig reversed in polarity in each H to the selected rows, and realizes 1F inversion driving in each of the upper side pixel part 11A and the lower side pixel part 11B.

As described above, in the active matrix type display device including the pixel array unit 11 formed by two-dimensionally arranging pixels 20 including an electrooptic element (liquid crystal cell 22 in the present example) in the form of a matrix, the pixel array unit 11 is divided into a plurality of areas (two areas 11A and 11B in the present example) in a vertical direction, while the plurality of areas being vertically scanned in order (alternately in the present example) in a unit of a row, pixels of the plurality of areas are selected in a unit of a row, and the video signal Vsig reversed in polarity in each H is written to the pixels of the selected row. Thereby the following effects are obtained.

By realizing 1F inversion driving in each of the upper side pixel part 11A and the lower side pixel part 11B, it is possible to improve contrast and extend life using VA liquid crystal, which is advantages of the 1F inversion driving method. Incidentally, at a boundary line part between the upper side pixel part 11A and the lower side pixel part 11B, the same timing (always a 2H shift) as in other parts is provided in principle, but the system causes a shift corresponding to a vertical blanking period (15H to 30H). Thus, effects of coupling are insignificant.

In addition, as for crosstalk, which is a problem of the 1F inversion driving method, the video signal Vsig reversed in polarity in each H is written to the pixels of the selected rows via the signal lines 15-1 to 15-*n*, and thereby amounts of leakage are the same within one screen, so that shading does not occur.

Figure 9:
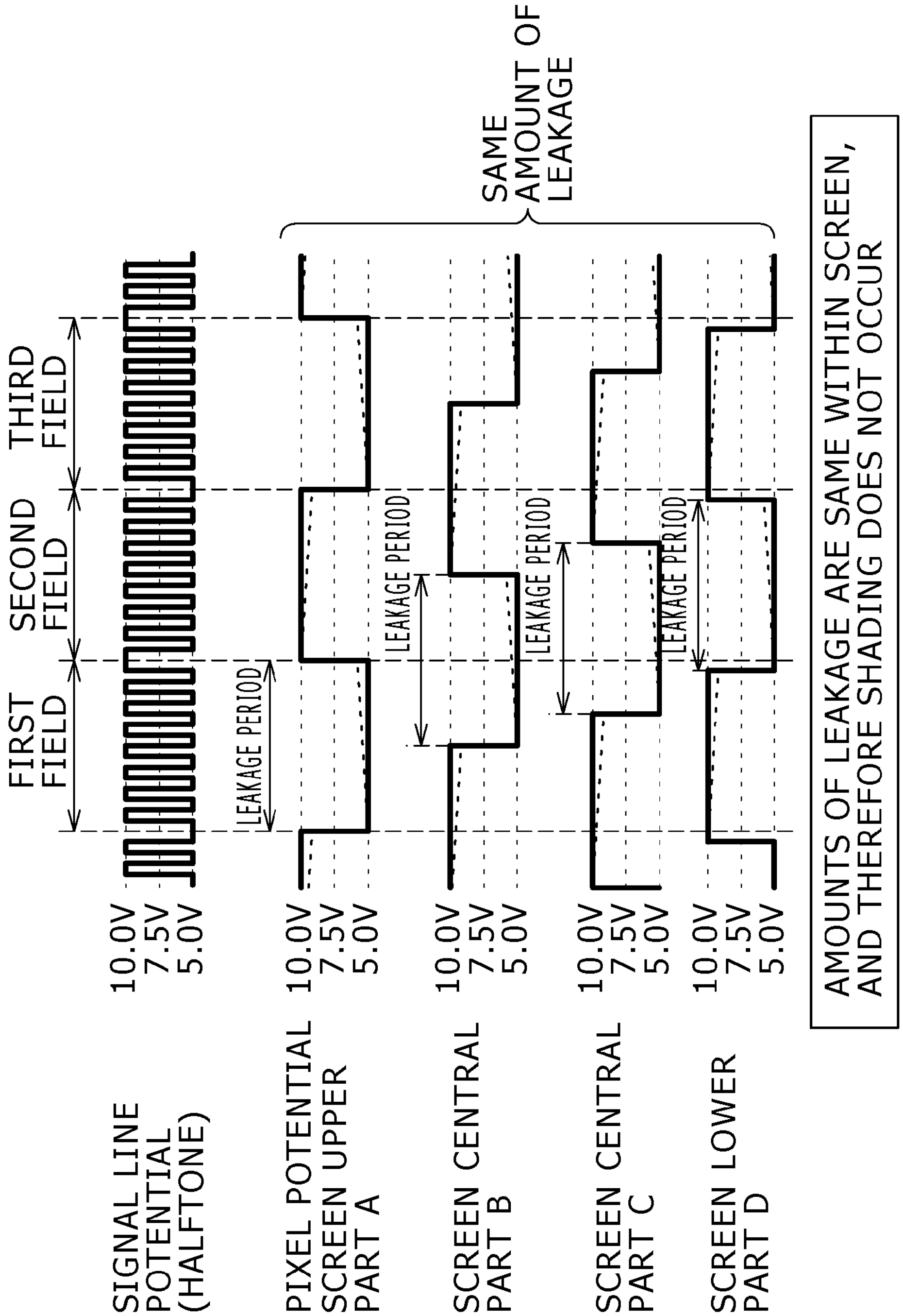
FIG. 9 is a timing chart of assistance in explaining that shading does not occur.

Describing this more specifically, taking as an example a case where the common voltage Vcom is 7.5 V and the potential of the signal lines 15-1 to 15-*n* is 10.0 V on an H-side/5.0 V on an L-side (halftone), as shown in FIG. 9, for example, the screen upper part A, the screen central parts B and C, and the screen lower part D have a same leakage period, and therefore amounts of leakage are the same within one screen. As a result, as shown in FIG. 10, shading does not occur. Incidentally, the polarity of the video signal Vsig in FIG. 10 represents the case of the field of FIG. 8A, and in the next field, as shown in FIG. 8B, the positive/negative polarity is reversed.

Further, as for crosstalk caused by coupling and leakage, the coupling and the leakage are both ½ or less of that when an ordinary 1F inversion driving method (for the whole screen) is employed, and therefore crosstalk can also be reduced to ½ or less of that of the ordinary 1F inversion driving method.

Further, insusceptibility to a stripe domain is enhanced. A stripe domain means that a black line remains when a change is made to gray display (gray screen) after black display is retained for a certain time at a certain voltage or higher, and under magnification, a disclination (a defect caused by translation of a crystal lattice) line remains as it is, and a light leakage is multiplied therefrom to form the black line. In the 1H inversion driving method, the polarity of potential differs at a boundary between pixels, and thus a difference occurs in inclination of the liquid crystal at the boundary between the pixels. In the 1F inversion driving method, on the other hand, the same potential occurs on both sides of the pixel boundary, and thus the inclination of the liquid crystal is the same even at the pixel boundary, so that there is no stripe domain in principle.

Figure 13B:
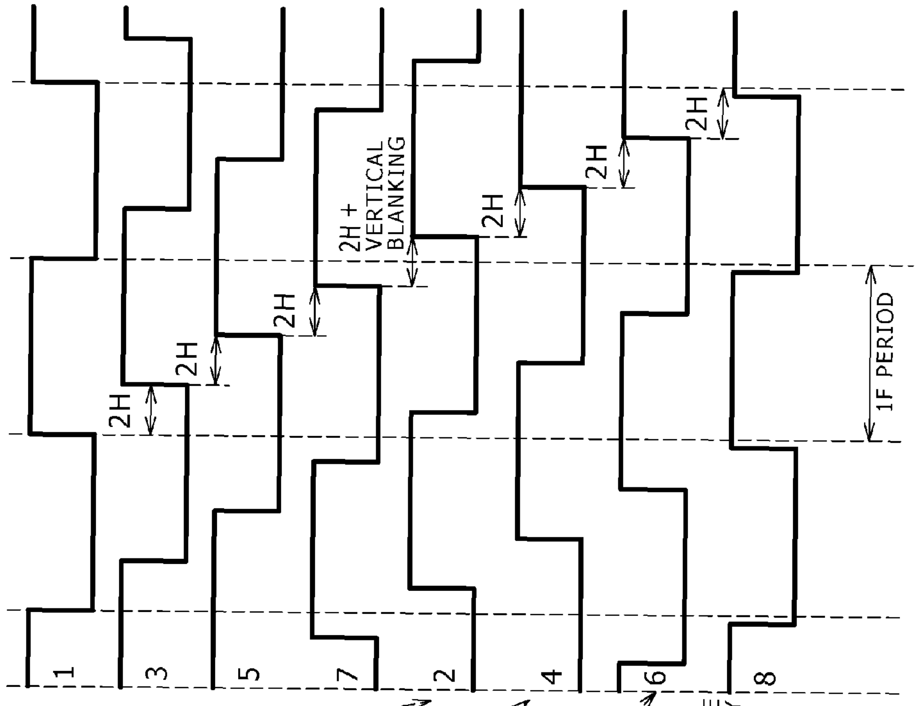
FIG. 13 is a diagram showing a result of comparison of pixel potential in a case (A) where a 1F inversion driving according to an example of the related art is used and a case (B) where a 1H+1F inversion driving according to the present invention is used.
Figure 13A:
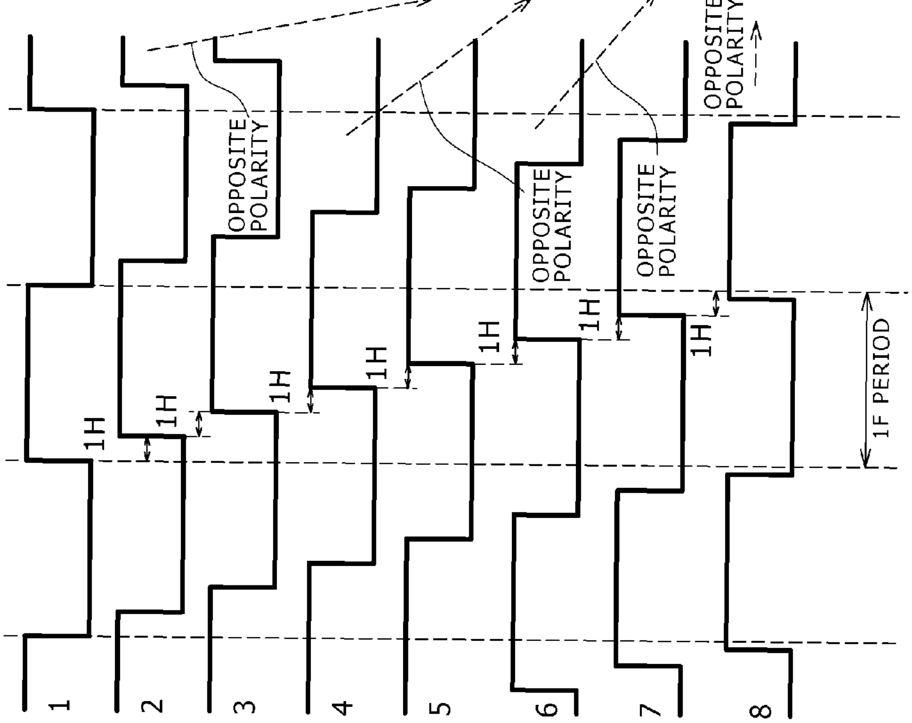

Incidentally, FIG. 13 shows a result of comparison of pixel potential in a case (A) where a 1F inversion driving according to the example of the related art is used and a case (B) where a 1H+1F inversion driving according to the present invention is used. A case where four vertical scanning operations are performed in each of the upper side pixel part 11A and the lower side pixel part 11B, that is, a total of eight vertical scanning operations are performed. It is understood that in either of the cases (A) and (B), 1F inversion appears to be performed. However, in the case (B) where the 1H+1F inversion driving according to the present embodiment is used, there occurs a slight shift corresponding to a vertical blanking period at a seventh-second (boundary). The vertical blanking period is about 15H to 30H. When the vertical blanking period is 15H and a V (voltage)–T (transmittance) characteristic indicates 50%, there is a luminance difference of about 0.5%.

It is to be noted that while in the foregoing embodiment, the pixel array unit 11 is divided into two parts in the vertical direction, and vertical driving means is formed by the two vertical driving circuits 12A and 12B corresponding to the number of divided parts of the pixel array unit 11, the pixel array unit 11 can be divided into three or more parts in the vertical direction. In this case, letting N be the number of divided parts, it suffices to provide N vertical driving circuits corresponding to the number of divided parts, set the respective pulse widths of the vertical start pulse VST and the vertical clock pulse VCK to N times the respective pulse widths of the vertical start pulse and the vertical clock pulse used when scanning is performed sequentially by one vertical driving circuit without the pixel array unit 11 being divided, and select pixels in the N divided areas in a unit of a row while vertically scanning the N divided areas in order in a unit of a row.

In addition, while the foregoing embodiment has been described by taking as an example a case where the present invention is applied to a liquid crystal display device using a liquid crystal cell as an electrooptic element of a pixel, the present invention is not limited to this application example, and is applicable to active matrix type display devices in general formed in a form of a matrix by two-dimensionally arranging pixels including an electrooptic element, such as organic EL display devices using an organic EL (electroluminescence) element as an electrooptic element of a pixel, for example.

INDUSTRIAL APPLICABILITY

According to the present invention, the advantages of the 1F inversion driving method and the advantages of the 1H inversion driving method are given. It is therefore possible to suppress occurrence of crosstalk and shading while improving contrast and extending life using VA liquid crystal.

The invention claimed is:

1. A display device comprising:

a pixel array comprised of two-dimensionally arranging pixels, each including an electro-optic element, in a matrix, the pixel array divided into N areas in a vertical direction, where N is an integer of 2 or more;

N vertical driving circuits, each corresponding to one of the N areas of the pixel array and configured to, in each field period, output drive pulses to sequentially select each row of pixels of the corresponding area, such that rows of pixels selected by the N vertical driving circuits sequentially alternate among the N areas; and a horizontal driving circuit configured to output a video signal inverted in polarity in each horizontal period to pixels of the row selected by the N vertical driving circuits, wherein, the polarity of the video signal output to each row of pixels is inverted between two successive field periods, the N vertical driving circuits sequentially generate a drive pulse for selecting the pixels in a row of pixels on a basis of a second vertical start pulse and a second vertical driving clock having pulse widths N times respective pulse widths of a first vertical start pulse and a first vertical clock pulse used when scanning is performed sequentially without the pixel array unit being divided, and each vertical driving circuit includes (i) a shift register that performs transfer operation in synchronism with the second vertical driving clock in response to the second vertical start pulse, and sequentially outputting a transfer pulse from each transfer stage, and (ii) a first logical product circuit group that obtains a logical product of a transfer pulse of an own stage and a transfer pulse of a next stage, the transfer pulses being output from the shift register, and an enable pulse having a period of ½N of a period of the second vertical clock pulse and having a pulse width narrower than ½N of a pulse width of the second vertical clock pulse.

2. The display device as claimed in claim 1, wherein:

N=2; and each vertical driving circuit further includes a second logical product circuit group that obtains a logical product of third vertical clock pulses opposite in phase from each other, the third vertical clock pulses having a same period as the second vertical clock pulse and having phases shifted by 90 degrees with respect to the second vertical clock pulse, and each output pulse of the first logical product circuit group, and the enable pulse is shifted in phase by 180 degrees between the two vertical driving circuits.

3. A method of driving a display device, the display device comprising (1) a pixel array, the pixel array formed by two-dimensionally arranging pixels, each including an electro-optic element, in a matrix, and the pixel array divided into N areas in a vertical direction, where N is an integer of 2 or more, (2) N vertical driving circuits, each corresponding to one of the N areas of the pixel array, and (3) a horizontal driving circuit, the method comprising:

performing one-field inversion driving by outputting a video signal inverted in polarity in each field period to the display device;

in each field period, outputting, with each vertical driving circuit, drive pulses to sequentially select each row of pixels of the corresponding area, such that rows of pixels selected by the N vertical driving circuits sequentially alternate among the N areas; and outputting, with the horizontal driving circuit, a video signal inverted in polarity in each horizontal period to pixels of the row selected by the N vertical driving circuits, wherein, the polarity of the video signal output to each row of pixels is inverted between two successive field periods, the N vertical driving circuits sequentially generate a drive pulse for selecting the pixels in a row of pixels on a basis of a second vertical start pulse and a second vertical driving clock having pulse widths N times respective pulse widths of a first vertical start pulse and a first vertical clock pulse used when scanning is performed sequentially without the pixel array unit being divided, and each vertical driving circuit includes (i) a shift register performing transfer operation in synchronism with the second vertical driving clock in response to the second vertical start pulse, and sequentially outputting a transfer pulse from each transfer stage, and (ii) a first logical product circuit group obtaining a logical product of a transfer pulse of an own stage and a transfer pulse of a next stage, the transfer pulses being output from the shift register, and an enable pulse having a period of ½N of a period of the second vertical clock pulse and having a pulse width narrower than ½N of a pulse width of the second vertical clock pulse.

* * * * *